United States Patent [19]
Rafoth

[11] Patent Number: 6,012,733
[45] Date of Patent: Jan. 11, 2000

[54] ADVANCED BIKE FRAME DESIGN

[76] Inventor: Randall F. Rafoth, P.O. Box 480, Palo Alto, Calif. 94302-0480

[21] Appl. No.: 08/911,139

[22] Filed: Aug. 14, 1997

[51] Int. Cl.[7] .................................................. B62K 1/00
[52] U.S. Cl. ..................................... 280/281.1; 280/282
[58] Field of Search ................................ 280/281.1, 282, 280/288.3

[56] References Cited

U.S. PATENT DOCUMENTS

| | | | |
|---|---|---|---|
| 4,427,209 | 1/1984 | Morita | 280/281.1 |
| 4,540,190 | 9/1985 | Moulton | 280/281.1 |
| 4,813,696 | 3/1989 | Moulton | 280/281.1 |

*Primary Examiner*—Christopher P. Schwartz
*Assistant Examiner*—C. T. Bartz
*Attorney, Agent, or Firm*—John P. Halvonik

[57] ABSTRACT

An advanced frame design primarily for mountain bikes that utilizes an advanced construction of lightweight tubes to create bicycle framework of greater strength without added weight. The frame design utilizes pairs of thin tubes arranged within the bike frame for increased strength and flexibility. The top tube and down tubes are of double tube construction in the invention. Bridgework tubes are smaller tubes that are used to connect portions of the various doubled tubes to one another to provide a secondary support structure for the frame.

7 Claims, 2 Drawing Sheets

ADVANCED BIKE FRAME DESIGN

BACKGROUND OF THE INVENTION

The invention relates to the field of bicycles and in particular to a mountain bike that uses a lightweight frame that is designed with the strength necessary to support frames used for rugged riding. The invention described herein is directed to an improved frame design that has added strength and may utilize lightweight tubes in order to cut down on the weight needed for the frame.

It is also contemplated that the advanced frame design described herein may be useful in constructing bicycles out of more advanced materials such as: chrome-molly (chrome-molybdenum steel), titanium, carbon fiber, and BORALYN (lightweight material being used in bicycle frames by Univega Co. of Long Beach, Calif.). Such space age materials can be made of thinner and lighter construction that the current state of the art materials used in such bikes. The frame described herein can utilize such newer materials due the sturdy construction of the frame.

SUMMARY OF THE INVENTION

An improved bicycle frame, primarily designed for rugged applications such as those encountered for mountain bicycles. The framework utilizes thinner and lighter frame tubes while maintaining a sturdy construction. Thinner, doubled tubes in the invention are substituted for the normally larger and singular tubes used in the prior art bicycles. This includes the down tubes and top tubes thus creating doubled tubes that constitute the primary structure. The bottom bracket is supported at the base of the seat tube and down tubes without being directly connected to the chain stay tubes, thus creating "elevated" chain stay tubes in the preferred construction. The chain stay tubes are parallel to one another and extend directly from the rear axle to the head set unlike many state of the art bicycle designs.

Bridgework members form a secondary framework and are smaller than the doubled, primary tubes. Bridgework members connect those sections of the frame that need reinforcing such as the area between the pairs of down tubes and between down tubes and the seat post. The area near the bottom bracket is thought to especially need these reinforcing tubes.

It is an object of the invention to provide an advanced bicycle frame design that can be made of lightweight construction while being sturdy enough for rugged applications such as mountain biking.

Another objective is to provide an advanced bicycle frame design that may be built of lightweight materials in a framework that can accommodate lightweight, high tensile strength materials such as carbon fiber, etc.

Another objective is to provide a bicycle frame that utilizes paired tubes in order to make a frame that can be built with frame tubes that are of decreased diameter and of decreased thickness without detracting from the strength of the frame.

Another objective is to provide an advanced bicycle frame design that may be built of resilient construction in order to accommodate lighter weight tube members so that the frame can be built with increased strength without having to use heavier and thicker tubular members.

Another objective is to provide a bicycle frame design for mountain bikes that decreases the amount of tubing required in connection with the bottom bracket to reduce the chances of entangling the bottom bracket and supporting structure with objects.

Other objectives of the invention should be readily apparent to those skilled in the art once the invention has been described.

DESCRIPTION OF THE PREFERRED EMBODIMENT

Figure 1:
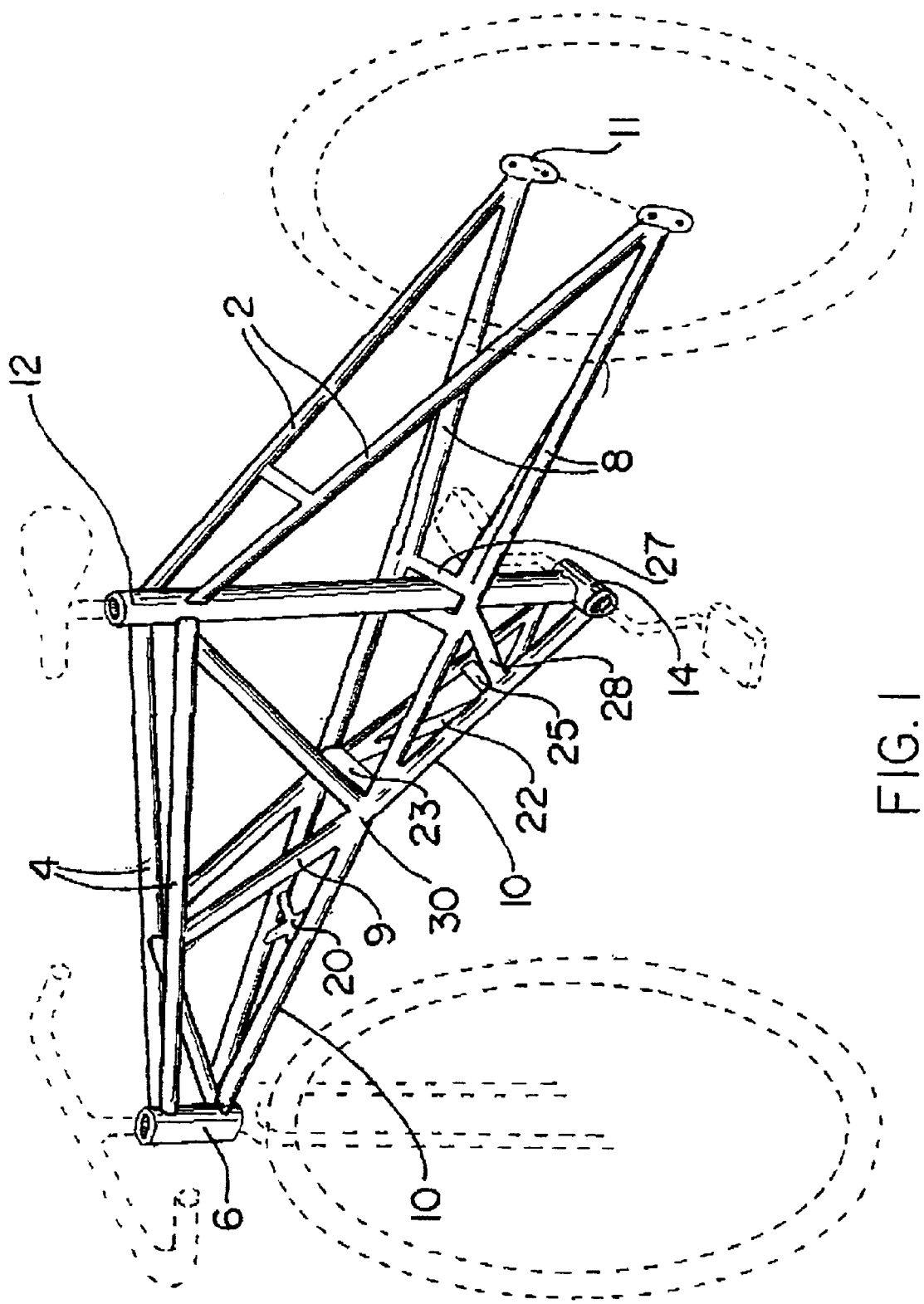
FIG. 1 Overall construction of bicycle framework.
Figure 2:
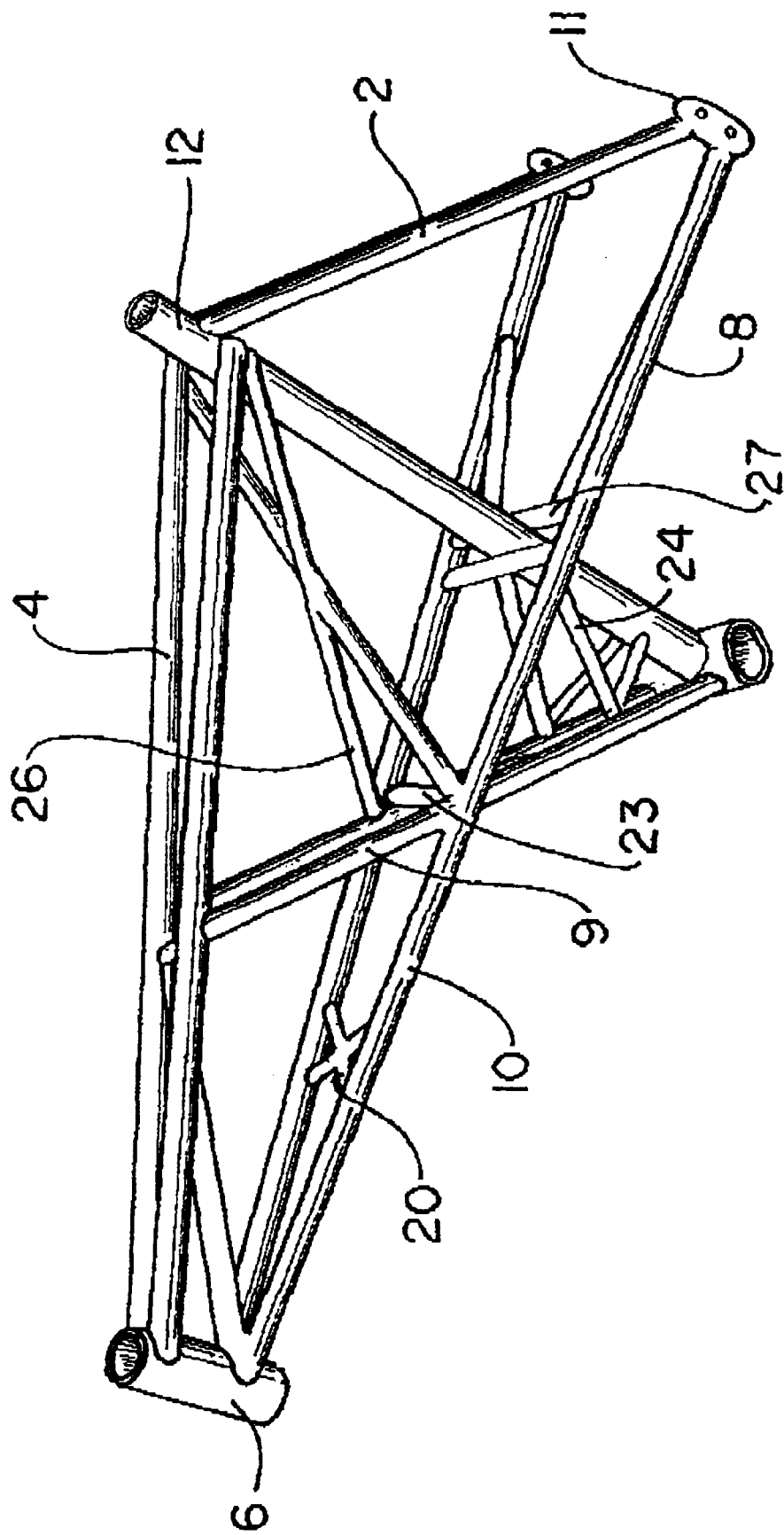
FIG. 2 Slightly different view of frame.

The overall construction of the device is shown in FIG. 1. Normally those tubes that comprise the top tube and down tubes are singular tubes in the standard bicycle framework. In the invention herein described these tubes are doubled thus creating pairs of top tubes 4 (connected at one end to seat post tube 6) and down tubes 9 and 10. Note there are two pairs of down tubes in the preferred construction. Also down tubes may be referred to as "bottom tubes." The chain stay tubes 8 and seat stay tubes 2 also exist as double tubes but this is standard construction. The seat post 12 remains a singular tube in this invention.

The pairs of tubes that comprise the doubled pairs (front tubes, two pair of down tubes, seat stay tubes, and chain stay tubes) are of smaller diameter and preferably thinner than the normal sized tubes used in conventional bicycle frames. These doubled pairs and the seat tube may be said to comprise the primary framework of the bicycle. The use of the doubled tubes and additional reinforcing bridgework allows the frame to use smaller tubes of stronger materials to provide a lighter frame with sufficient strength and flexibility for a mountain type bicycle.

It is believed that in the case of steel construction, tubes of only ½ to ⅓ the diameter of normal state of the art tubes may be used in this design without losing any of the strength or flexibility inherent in conventional designs. The metal used may also be thinner than standard tubes. Steel tubes having a thickness of only 0.080" may be used in this design.

Secondary members function as a bridgework to connect portions of the frame for additional reinforcement. These tubes are typically of smaller diameter than the primary tubes and may be of similar thickness and/or thinner. It is thought that the areas between the pair of bottom tubes 9 and 10 as well as the area between the down tubes and the seat post may find need for reinforcement through the bridgework.

It is believed that the secondary members would find use in connecting the down tubes to the seat post in the area near the bottom bracket 14 (that holds the crank set). These bridgework members 24 would usually number 2 or 4 and may directly connect the pair of down tubes to the seat post. In addition, the bridgework in this area could connect across the pair of down tubes e.g. members 22 and 25. The head set is shown as 6 in FIG. 1.

Bridgework members 20 may also be used to connect across the pair of down tubes 10 in the upper area of the down tubes, thus providing reinforcing members that are parallel to the plane formed by the pair of down tubes. Again these bridgework tubes are preferably smaller than the primary tubes and may cross one another as shown.

Straight bridgework members 23 may also connect across the down tubes. Other bridgework members 26 may be used to connect the down tubes to the seat post tube. One pair 27 may connect where the chain stay pair meets the down tube pair. Again these tubes may be grouped in pairs.

Preferably 6–8 pairs of such bridgework tubes may be used. The bridgework members may cross one another e.g. pair 20 or 26 or be in zig zag fashion e.g. 22 or be straight across e.g. 24.

The bottom bracket is essentially suspended from the down tubes 10 and the seat post tube 12. The term "suspended" in this instance means that there is no separate tube (e.g. a chain stay tube) going across that bracket to further support this bracket as is the case with most such frames. In other words, the bottom bracket hangs below the line of the chain stay tubes. Again, the chain stay construction in this invention is believed to be unique as this pair of tubes goes in a direct line from the drop outs 11 to the front head set (through the tubes 10) and is not directly connected to the bottom bracket. The chain stays may said to be "elevated."

This construction of the framework in connection with the suspended bottom bracket 14 decreases the likelihood that obstacles may get caught up in the lower structure of the bicycle framework. As there are likely to be stresses in this area greater than that felt in the rest of the frame it is thought that the use of the bridgework members in this area would be beneficial. Such members are likely to increase the flexibility of the structure to thereby allow for the use of lighter tubes and less tubes in general.

The frame constructed along these lines can be of very lightweight construction. It is believed that models constructed along this design may be made out of chrome-moly steel and weigh only 3.7 lbs. or less. Further savings in weight may be gained through the use of lighter, high tensile materials such as carbon fiber, titanium, etc. It is believed that framework described herein will allow for the use of such materials.

I claim:

1. An improved bicycle framework comprising: a seat post tube having two ends, one of said ends having a bottom bracket and the other of said ends adapted to be in connection with a seat; a head set tube having a top portion adapted to be in connection with a pair of handle bars, a pair of top tubes generally parallel to one another; said top tubes in connection with said top portion of said head set tube and said seat post tube; a first pair of down tubes generally parallel to one another and having one end of each of said first pair of down tubes in connection with said pair of top tubes at a point on said top tubes about midway between said seat post and said head set, the other end of said first pair of down tubes in connection with said bottom bracket; a pair of reinforcing tubes, each of said reinforcing tubes connected to one of said first pair of down tubes and said seat tube.

2. The apparatus of claim 1 having drop out portions and having a second pair of down tubes having one end connected to said head set and extending beyond said seat post to connect with said drop out portions, each of said second pair of down tubes connected to one of said first pair of down tubes at a point of intersection and having a straight bridgework member connected to each of said second pair of down tubes at said point of intersection.

3. The apparatus of claim 2 having a pair of chain stay tubes extending from said second pair of down tubes and located above said bottom bracket.

4. The apparatus of claim 2 wherein said top tubes and said down tubes are made of carbon fiber material.

5. The apparatus of claim 2 wherein said top tubes and said down tubes are made of titanium material.

6. The apparatus of claim 3 wherein said top tubes and said down tubes are made of carbon fiber material.

7. The apparatus of claim 3 wherein said top tubes and said down tubes made of titanium material.

\* \* \* \* \*